US010973061B2

(12) United States Patent
Dieckmann et al.

(10) Patent No.: US 10,973,061 B2
(45) Date of Patent: Apr. 6, 2021

(54) METHOD FOR ESTABLISHING A WIRELESS VEHICLE NETWORK

(71) Applicant: WABCO Europe BVBA, Brussels (BE)

(72) Inventors: Thomas Dieckmann, Pattensen (DE); Sören Hübner, Varel (DE); Thomas Wolf, Barsinghausen (DE)

(73) Assignee: WABCO Europe BVBA, Brussels (BE)

( * ) Notice: Subject to any disclaimer, the term of this patent is extended or adjusted under 35 U.S.C. 154(b) by 0 days.

(21) Appl. No.: 16/330,001

(22) PCT Filed: Jun. 26, 2017

(86) PCT No.: PCT/EP2017/000739
§ 371 (c)(1),
(2) Date: Mar. 1, 2019

(87) PCT Pub. No.: WO2018/041381
PCT Pub. Date: Mar. 8, 2018

(65) Prior Publication Data
US 2019/0208552 A1    Jul. 4, 2019

(30) Foreign Application Priority Data

Sep. 2, 2016   (DE) .................... 10 2016 010 644.1

(51) Int. Cl.
*H04W 76/10*    (2018.01)
*H04W 4/80*    (2018.01)
(Continued)

(52) U.S. Cl.
CPC .......... *H04W 76/10* (2018.02); *B60R 16/023* (2013.01); *H04L 67/12* (2013.01); *H04W 4/40* (2018.02); *H04W 4/80* (2018.02)

(58) Field of Classification Search
CPC ... B60D 1/36; B60D 1/58; B60D 1/62; B60Q 1/305; B62D 53/12; H04W 76/10;
(Continued)

(56) References Cited

U.S. PATENT DOCUMENTS 10,149,348 B2 * 12/2018 Dieckmann ............ G08C 17/00
10,160,427 B2    12/2018 Risse et al.
(Continued)

FOREIGN PATENT DOCUMENTS

DE    102013217684 A1    3/2015
DE    102014004182 A1    9/2015
DE    102014015394 A1    4/2016

OTHER PUBLICATIONS

International Search Report for WO Application No. PCT/EP2017/000739, dated Aug. 11, 2017, 2 pages.
(Continued)

*Primary Examiner* — Steven H Nguyen
(74) *Attorney, Agent, or Firm* — Warner Norcross + Judd LLP

(57) ABSTRACT

A method for establishing a wireless network for a vehicle is provided herein. The vehicle comprises a tractor unit and a trailer. The tractor unit comprises at least one first station and a first control unit and the trailer comprises a second station and a second control unit. The method comprises supplying electrical energy to the second control unit. The method further comprises interconnecting the first control unit and the second control unit via a physical interface. The method further comprises generating a defined message by the second control unit and receiving the defined message by the first control unit via the physical interface. The method further comprises transmitting information required to establish the wireless network via the first station only when the defined message is present in the first station.

11 Claims, 1 Drawing Sheet

(51) Int. Cl.
*H04L 29/08* (2006.01)
*H04W 4/40* (2018.01)
*B60R 16/023* (2006.01)

(58) Field of Classification Search
CPC ........... H04W 4/80; H04W 4/40; H04W 4/48; H04L 67/12; B60R 16/023
See application file for complete search history.

(56) References Cited

U.S. PATENT DOCUMENTS

| | | | | |
|---|---|---|---|---|
| 2002/0030590 | A1* | 3/2002 | Dieckmann | B60D 1/62 340/431 |
| 2008/0157944 | A1* | 7/2008 | Breen | G08G 1/20 340/431 |
| 2008/0303648 | A1* | 12/2008 | Day | B60D 1/62 340/431 |
| 2013/0148748 | A1* | 6/2013 | Suda | H04B 3/546 375/257 |
| 2017/0088104 | A1* | 3/2017 | Risse | H04W 76/10 |

OTHER PUBLICATIONS

Machine assisted translation of DE102013217684A1 obtained from https://worldwide.espacenet.com on Feb. 28, 2019, 12 pages.

\* cited by examiner

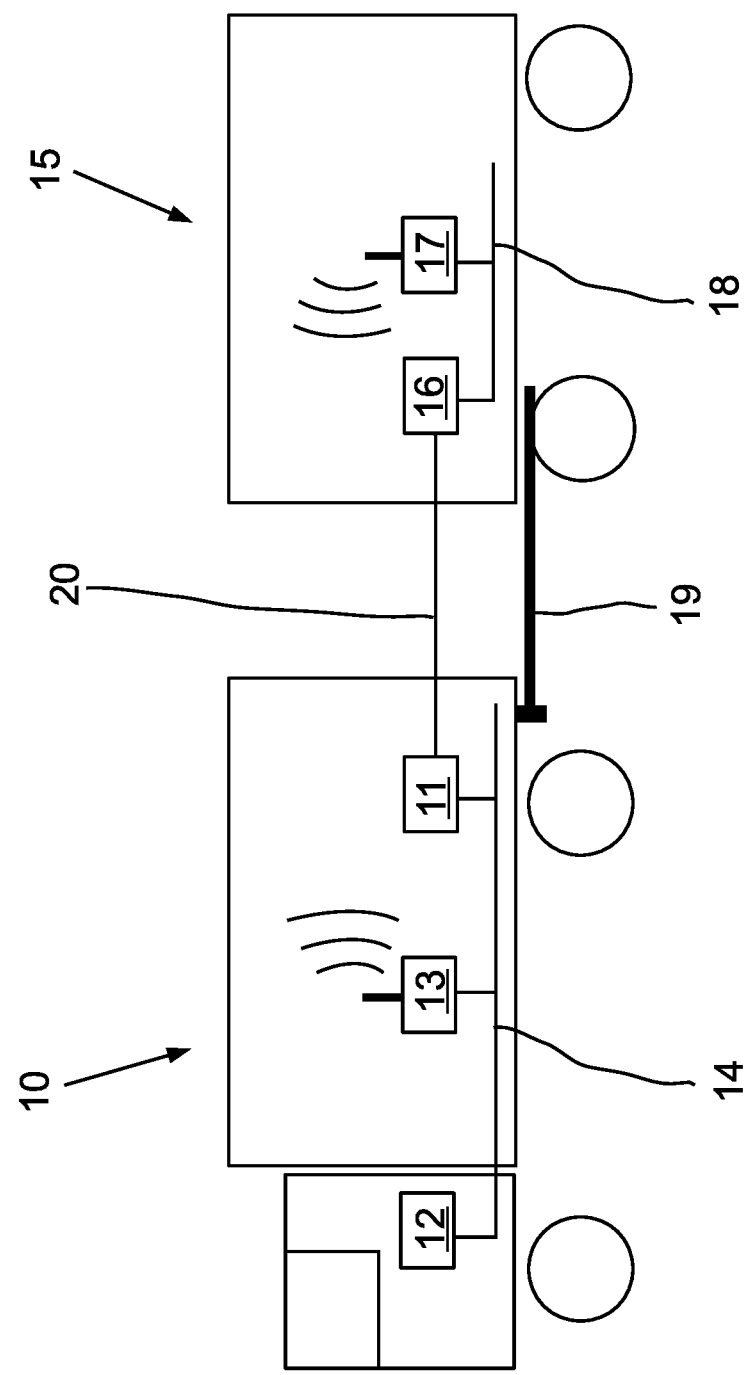

METHOD FOR ESTABLISHING A WIRELESS VEHICLE NETWORK

CROSS-REFERENCE TO RELATED APPLICATIONS

This application is a national phase entry of PCT/EP2017/000739, filed Jun. 26, 2017, which claims priority to German Patent Application No. 10 2016 010 644.1, filed Sep. 2, 2016, both of which are incorporated herein by reference in their entirety.

FIELD OF THE DISCLOSURE

The disclosure relates to a method for establishing a wireless vehicle network with at least one first station in a tractor unit and a second station in a trailer, wherein the first station transmits information required to establish the wireless network and a first control unit assigned to the first station receives a defined message from a second control unit assigned to the second station via a physical interface between the tractor unit and the trailer after the second control unit has been supplied with electrical energy and the two control units have been interconnected via the physical interface. In addition, the disclosure relates to a control unit and a computer program, a computer program product or an app.

BACKGROUND

A method for establishing and operating a wireless vehicle network is described in DE 10 2014 015 394 A1. Reference is made to the disclosure, and the full content of the disclosure in the aforementioned document is also intended to form part of the present application. The automated establishment of a connection between a first station in a tractor unit and a second station in a trailer, inter alia, is presented. The attempt to establish a connection starts as soon as specific boundary conditions are satisfied. With the start of the connection establishment, the first station transmits beacons via a radio link with the details normally provided in a WLAN (SSID, encryption type, etc.) and with additional (freely selectable) details. This takes place even if a trailer has not yet been connected and the connection establishment must fail.

Motor-driven goods vehicles, in particular, are regarded as tractor units. These vehicles have various electronic control units which exchange information via a CAN data bus. Typical control units in the tractor unit are a brake control unit, an engine control unit and a transmission control unit.

A brake control unit with which, inter alia, brakes of the trailer are controlled in order to operate an anti-lock braking system is typically present in the trailer also. The control unit in the trailer can be connected to a CAN data bus.

The brake control unit of the trailer and the brake control unit of the tractor unit are normally interconnected to exchange information with one another in accordance with ISO 11992 or using an electrical supply line between the trailer and the tractor unit via which data can be transmitted by means of power line communication (PLC). The brake control unit in the tractor unit makes the information transmitted from the trailer available on the CAN data bus of the tractor unit (in the CAN format). As a result, the information transmitted from the brake control unit of the trailer is readable for all units connected to the CAN data bus of the tractor unit.

The message format in the CAN data bus is based on SAE J1939. A special message from the brake control unit in the trailer is referred to as EBC1 and, in accordance with the standard, contains information relating to different parameters of a parameter group (PGN 61441). A number, the Suspect Parameter Number (SPN), is furthermore assigned to each parameter. SPN 1836 relates to a "Trailer ABS Status" and consists of two bits which may in each case be "0" or "1". This results in four options for the "Trailer ABS Status" (quoted from SAE J1939):

00 Trailer ABS Status Information available but not active
01 Trailer ABS active
10 Reserved
11 Trailer ABS Status Information not available or parameter not supported The message EBC1 with the "Trailer ABS Status" is present on the CAN data bus of the tractor unit as soon as the exchange of the information between the brake control unit of the trailer and the brake control unit of the tractor unit has taken place.

BRIEF SUMMARY

A method for establishing a wireless network for a vehicle is provided herein. The vehicle comprises a tractor unit and a trailer. The tractor unit comprises at least one first station and a first control unit with the first control unit assigned to and in communication with the first station. The trailer comprises a second station and a second control unit with the second control unit assigned to and in communication with the second station. The method comprises supplying electrical energy to the second control unit. The method further comprises interconnecting the first control unit and the second control unit via a physical interface between the tractor unit and the trailer. The method further comprises generating a defined message by the second control unit and receiving the defined message by the first control unit via the physical interface. The method further comprises transmitting information required to establish the wireless network via the first station only when the defined message is present in the first station.

BRIEF DESCRIPTION OF THE DRAWING

The invention is described in greater detail below with reference to the accompanying FIGURE, in which:

FIG. 1 illustrates a perspective view of one embodiment of the vehicle including a first station and a second station.

DETAILED DESCRIPTION

With reference to the specific embodiment of the FIGURES, wherein like numerals generally indicate like parts throughout the several views, a method for establishing the wireless vehicle network incorporating a tractor unit and trailer is provided herein. The establishment begins only when the tractor unit and trailer are interconnected.

It is provided that the first station wirelessly transmits the information required to establish the wireless network only when the defined message is present in the first station. As contemplated herein, the first station in the tractor unit initially waits for a defined message from the trailer before the establishment of the wireless network is started. The first station may be primarily a communication unit with which the wireless network is setup and via which the wireless communication is implemented. However, the communication unit can also be integrated into the first control unit. The first station then may contain the communication unit and the first control unit. The same can apply to the second station. The latter can also contain a second communication unit and the second control unit or the second communication unit without the second control unit.

As contemplated herein, a message from the second control unit can be present in the first station only when the tractor unit and trailer are interconnected. Only then does the method for establishing the network start. In this way, unsuccessful attempts to establish the network are avoided.

As contemplated herein, the defined message may contain a status of the second control unit. This means that information relating to the status of the control unit may be transmitted simultaneously with the defined message.

As contemplated herein, the second control unit may be a brake control unit. In particular, the defined message may contain a status of an anti-locking braking system.

As contemplated herein, in certain embodiments, the first station transmits the information required to establish the wireless network only when a CAN message (from the second station) with the designation EBC1 is present in the first station and a first bit of the "Trailer ABS Status" contained in the message has the value "0". The establishment of the wireless vehicle network thus starts only when the aforementioned status information from the brake control unit of the trailer is present in the first station of the tractor unit. As a result, there is a high certainty that the brake control unit of the trailer, following the establishment of the wireless vehicle network, can be addressed after all via the wireless vehicle network.

In certain embodiments, the physical interface is formed by or contains a CAN data bus or a PLC connection.

A control unit to carry out the method is also provided herein. In certain embodiments, the control unit is a unit for controlling a communication unit, such as a WLAN module. However, it can also be a brake control unit, in particular with an integrated communication unit.

A computer program, computer program product or an app to carry out the method and/or for use with the control unit is also provided herein. A programmed algorithm may be contained therein which checks the presence of a specific message on the CAN data bus and also the content thereof, wherein the establishment of the wireless vehicle network starts depending on the result of the check.

As shown in FIG. 1, in certain embodiments, a tractor unit 10 is equipped with a pneumatic braking system and an electronic braking system. The latter may contain an electronic brake control unit 11. An engine control unit 12, a communication unit 13, and further elements (not included here in the drawing) are furthermore provided. The communication unit 13 may enable wireless communication via a WLAN, in certain embodiments, according to the IEEE 802.11 standard. The control units 11, 12 and the communication unit 13 may exchange information via a CAN data bus 14, or may be connected to the latter. CAN messages are present on the CAN data bus 14 in a format defined in the SAE J1939 standard.

A brake control unit 16 for an electronic braking system and a communication unit 17 may be provided in a trailer 15. Both units can exchange information via a CAN data bus 18 or can be connected to the CAN data bus 18. The communication unit 17 may contain a WLAN module.

In various embodiments, the trailer 15 is coupled to the tractor unit 10 with a tow bar 19. Pneumatic connections (not shown) between the trailer 15 and the tractor unit 10, an electrical connection (supply line, not shown) and a connection by a data line 20 may exist in parallel thereto. The data line, as a physical interface, may connect the brake control unit 16 to the brake control unit 11 of the tractor unit so that the two control units 11, 16 can exchange information directly in accordance with the ISO 11992 standard. Alternatively, a data exchange can be provided between the control units 11, 16 via the electrical supply line (not shown) according to the power line communication principle.

In various embodiments, the establishment of a wireless vehicle network by the two communication units 13, 17 is desired. Following the establishment of the network, an external WLAN device, e.g. a smartphone, can log in as a client to the network and can retrieve all information from the tractor unit 10 and the trailer 15 or can even perform control functions.

The establishment of the wireless vehicle network with verification of the network partners is described, inter alia, in DE 10 2014 015 394 A1. Reference is made thereto.

In certain embodiments, the brake control unit 11 and the communication unit 13 together form a first station of the intended vehicle network. Similarly, the brake control unit 16 and the communication unit 17 may form a second station in the intended vehicle network.

As a first step, the communication unit 13 or the first station may transmit information required to establish the wireless network. This information may be collected and responded to by the communication unit 17 or the second station. In order to avoid unnecessary activity of the first communication unit 13, the first communication unit 13 transmits only when a defined message from the communication unit 17 is present in the communication unit 13, wherein the defined message has previously been transmitted via a physical interface. In certain embodiments, the physical interface is the data line 20 or similarly an electrical line used for data transmission via power line communication.

As soon as the trailer 15 is supplied with electrical energy from the tractor unit 10 via the electrical supply line (not shown), electrical energy may be available to the brake control unit 16 also. The brake control unit 16 may transmit a defined message to the brake control unit 11 of the tractor unit 10. The control unit 11 converts the message into the format according to SAE J1939 and makes the message available on the CAN data bus 14. The defined message is thus visible for the communication unit 13.

In certain embodiments, the defined message contains a Trailer ABS Status with the Suspect Parameter Number 1836 as part of the CAN message EBC1. The Trailer ABS Status may be represented by two bits. As soon as the communication unit 13 establishes that the first bit of the Trailer ABS Status is a "0", the communication unit 13 starts the establishment of the wireless vehicle network. All further steps can then be carried out as described in DE 10 2014 015 394 A1 or in a different manner.

One particular advantage of the method as contemplated herein is that the establishment of the vehicle network is started only when a connection from the tractor unit to the trailer already exists. The existence of the connection is determined on the basis of the defined message in the control unit 16 provided in the trailer 15. The method is not limited to vehicles with a CAN data bus and/or WLAN networks. The data can also be exchanged in a different manner within the tractor unit 10 and the trailer 15 or from the trailer 15 to the tractor unit 10 and vice versa. Other radio communication technologies, such as Bluetooth, can also be used instead of the WLAN. The specific establishment of the connection can also be carried out in a manner differing from that described in DE 10 2014 015 394 A1. Only the start of the method for establishing the network is of particular importance in various embodiments.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A method for establishing a wireless network for a vehicle, the vehicle comprising a tractor unit and a trailer, the tractor unit comprising at least one first station and a first control unit with the first control unit assigned to and in communication with the first station, and the trailer comprising a second station and a second control unit with the second control unit assigned to and in communication with the second station, the method comprising:
   supplying electrical energy to the second control unit;
   interconnecting the first control unit and the second control unit via a physical interface between the tractor unit and the trailer;
   in response to the electrical energy being received at the second control unit, generating a defined message by the second control unit for transmission via the physical interface;
   receiving the defined message by the first control unit via the physical interface;
   transmitting a wireless signal containing information required to establish the wireless network via the first station only after the defined message is received by the first control unit and is present in the first station; and
   establishing the wireless network between the first station and the second station for connection to an external device,
   wherein the second control unit is a brake control unit, and wherein the first station transmits the information required to establish the wireless network only when a CAN message with the designation EBC1 is present in the first station and a first bit of the "Trailer ABS Status" contained in the message has the value "0".

2. The method as claimed in claim 1, wherein the defined message comprises a status of the second control unit.

3. The method as claimed in claim 1, wherein the physical interface is formed by or comprises a CAN data bus or a PLC connection.

4. The method of claim 1, wherein the defined message comprises a status of an anti-lock braking system.

5. The method of claim 1, wherein the first station comprises the first control unit.

6. The method of claim 1, wherein the second station comprises the second control unit.

7. The method claim 1, wherein the first control unit is a brake control unit.

8. The method of claim 1, wherein the physical interface comprises a data line between the tractor unit and the trailer.

9. The method of claim 1, wherein the electrical energy is generated by the tractor unit and wherein the electrical energy is provided to the second control unit via an electrical supply line between the tractor unit and the trailer.

10. The method of claim 9, wherein the physical interface comprises the electrical supply line.

11. The method of claim 1 further comprising the step of receiving the information required to establish the wireless network by the second station.

* * * * *